United States Patent

[11] 3,578,354

[72] Inventor Lawrence A. Schott
 15940 Warwick, Detroit, Mich. 48223
[21] Appl. No. 875,953
[22] Filed Nov. 12, 1969
[45] Patented May 11, 1971
 Continuation-in-part of application Ser. No.
 718,639, Apr. 3, 1968, now abandoned.

[54] VEHICLE SUSPENSION
 3 Claims, 2 Drawing Figs.
[52] U.S. Cl........................................... 280/96.2,
 301/133
[51] Int. Cl............................................ B60g 3/00
[50] Field of Search............................. 280/96.2,
 96.1; 301/133; 267/60; 180/43

[56] References Cited
UNITED STATES PATENTS
896,624  8/1908  Christie................ (301/133UX)
1,041,097 10/1912 Kennedy............... (301/133UX)
2,220,254 11/1940 Maier.................... 280/96.2

Primary Examiner—Kenneth H. Betts
Attorney—Hauke, Gifford and Patalidis

ABSTRACT: A vehicle suspension system wherein each wheel of the vehicle is supported on a spindle rotatably carried within a hub housing provided with a pair of radially extending pins having a common axis perpendicular to the axis of the spindle. A pair of frame supporting arms rigidly connected to the frame of the vehicle are slidably engaged by the pins for relative vertical and rotational movements respectively along and about the pin axis. A coil spring wound around the upper pin intermediate the hub housing and the upper frame supporting arm absorbs shock loads received by the wheel as it travels over irregularities in a road surface. A tie bar connected to the hub housing and adapted to be displaced in a horizontal plane by a suitable steering mechanism rotates the hub housing and the pins relative to the frame supporting arms to permit steering of the vehicle.

Patented May 11, 1971

3,578,354

INVENTOR.
LAWRENCE A. SCHOTT
By Hauke, Gifford & Patalidis
ATTORNEYS

VEHICLE SUSPENSION

CROSS-REFERENCE TO RELATED APPLICATIONS

The present application is a continuation-in-part of my Pat. application, Ser. No. 718,639, filed Apr. 3, 1968 for "Vehicle Suspension," and now abandoned.

BACKGROUND OF THE INVENTION

1. Field of the Invention

This invention relates to an arrangement for individually supporting the wheels of a vehicle, and particularly the wheels of small motor vehicles, and is equally applicable to wheels which are either driven, steered, or both driven and steered.

2. Description of the Prior Art

Heretofore, various mounting mechanisms have been used to provide vehicle suspension in which each wheel is rotatably mounted in a wheel supporting housing which in turn is so arranged as to permit both vertical movement of the wheel relative to the vehicle to absorb shock loads imposed thereon, and rotational movement about the vertical axis to permit steering of the vehicle. Other designs have also provided means for simultaneously driving and steering wheels used in such suspension systems.

Although such mechanisms have proved to be satisfactory for high-speed automotive use, they are too complex and expensive in their manufacture to be economical for use in small motor vehicles.

SUMMARY OF THE INVENTION

The present invention, which will be subsequently described in greater detail, comprises a hub housing having bearings for rotatably carrying a spindle connected to a wheel. Radially extending pins fastened on opposite sides of the exterior portion of the hub housing engage a pair of frame supporting arms and are so arranged as to permit both slidable movement of the wheel along an axis which is perpendicular to the spindle axis, and rotational movement about the pin axis. A coil spring carried by one of the radially extending pins is adapted to absorb shock loads imposed on the wheel while a tie bar carried by the hub housing permits steering of the vehicle.

The suspension of the present invention is of such a character that it will accommodate wheels which are adapted to be steered and not driven, or driven and not steered, or both driven and steered.

It is therefore an object of the present invention to provide a multipurpose suspension system which is simple in design and inexpensive to manufacture.

Other objects, advantages and application of the present invention will become apparent to those skilled in the art when the accompanying description of one example of the best mode contemplated for practicing the invention is read in conjunction with the accompanying drawing.

BRIEF DESCRIPTION OF THE DRAWING

The description herein makes reference to the accompanying drawing, wherein like reference numerals refer to like parts, and in which.

DESCRIPTION OF THE PREFERRED EMBODIMENT

Figure 2:
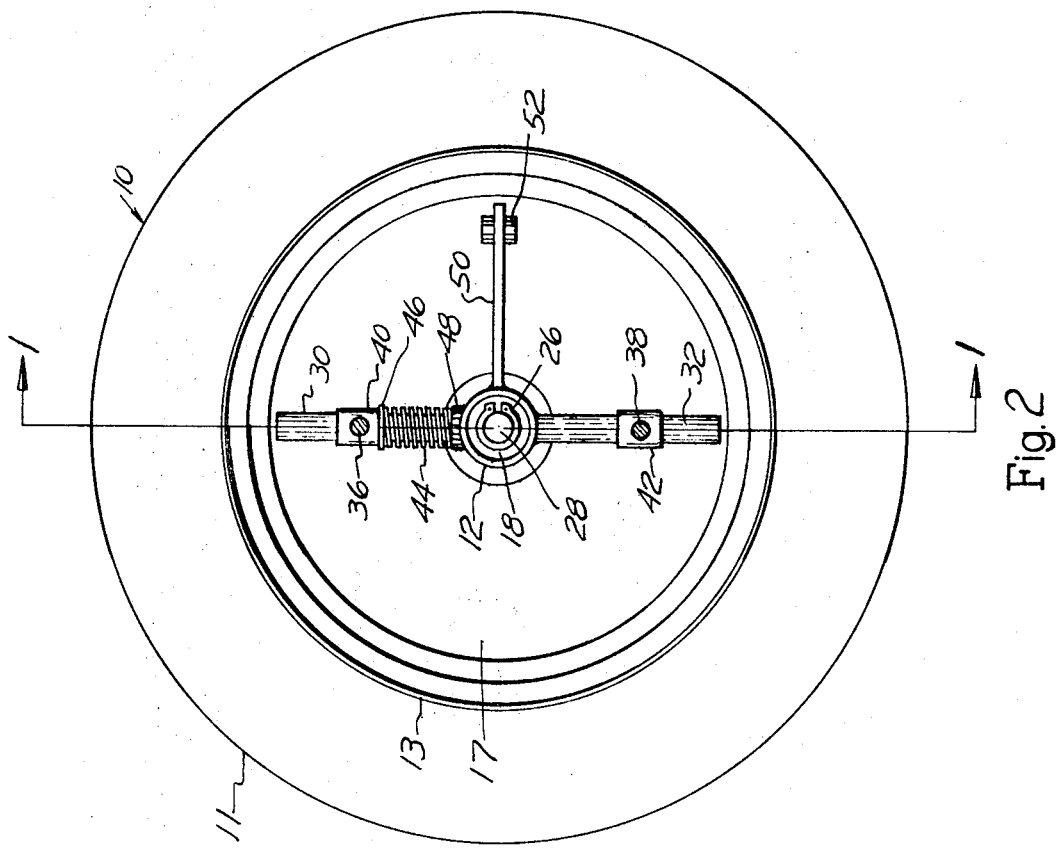
FIG. 2 is a view in side elevation of a wheel illustrating the construction of the inventive suspension system.
Figure 1:
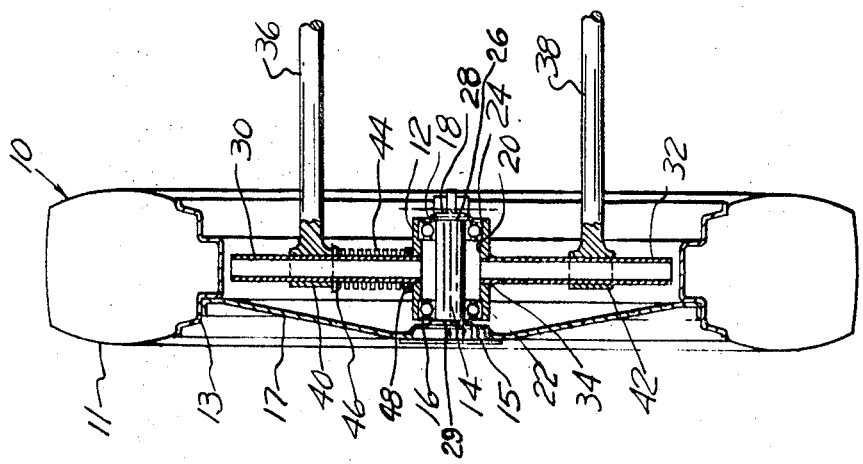
FIG. 1 is a transverse sectional view through a wheel equipped with a suspension system incorporating an example of the present invention and taken along line 1-1 of FIG. 2.

Referring now to the drawing for detailed description of an example of the present invention, a wheel 10 of a vehicle (not shown) has a conventional tire 11 mounted on a rim 13 which in turn is connected to an enlarged portion 15 of a spindle 14 by conventional means such as a rim supporting disc 17, as shown, spokes, or the like arrangement. The wheel 10 is thus adapted to rotate in unison with the spindle 14 which is suitably journaled within a pair of ball bearings 16 and 18 disposed at opposite ends of a spindle receiving bore 20, which extends axially through a hub housing 12. The spindle receiving bore 20 is enlarged at its opposite ends to form a pair of shoulders 22 and 24 against which the inner sides of the ball bearings 16 and 18 respectively abut so as to prevent inward axial movement thereof. The bearings 16 and 18 are disposed intermediate the inner periphery of the hub housing 12 and the outer periphery of the spindle 14 and provide for relative rotational movement of the spindle 14 within the hub housing 12. Thus, the spindle 14 and the wheel 10 carried thereby are adapted to rotate independently of the hub housing 12. The spindle 14 and the wheel 10 are retained within the bearings 16 and 18 by a snapring 26 engaging an appropriate groove on the inner end 28 of the spindle 14. The snapring 26 abuts the outer surface of the inner race of the bearing 18 and the enlarged portion 15 of the spindle 14 is provided with a reduced diameter shoulder portion 29 engaging the outer surface of the inner race of the bearing 16, such as to prevent axial movement of the spindle 14 relative to the spindle housing 12.

A pair of radially extending pins 30 and 32, made for example of hollow tubular steel are mounted on the hub housing 12, and the pins have a common vertical axis which is perpendicular to the axis of the spindle 14. Each of the pins 30 and 32 is fastened to the hub housing 12 by any suitable means, such as by welding as indicated at 34.

A pair of frame support arms 36 and 38 which are adapted to be rigidly connected to the vehicle by any suitable means (not shown), respectively, have bushings 40 and 42 slidably engaged over the outer peripheries of the radially extending pins 30 and 32. The bushings 40 and 42 provide a two-fold function: First, they permit the pins 30 and 32 to move vertically up and down relative to the frame supporting arms 36 and 38; and secondly, the bushings 40 and 42 permit the pins 30 and 32 to rotate about a vertical axis with respect to the frame supporting arms 36 and 38.

A coil spring 44 surrounding the upper radially extending pin 30 is disposed between the upper outer surface of the hub housing 12 and the frame supporting bushing 40, and has suitable guide washers 46 and 48 located at its opposite ends. The coil spring 44 supports that portion of the weight of the vehicle transmitted thereto by the frame support arm 36. Since the pins 30 and 32 slidably engage the bushings 40 and 42, there is relative movement between the vehicle and the wheel 10 to accommodate sudden vertical movement of the wheel due to an impact with irregularities in the road surface over which the wheel travels. Such slidable movement between the pins 30 and 32 and the frame supporting arms 34 and 36 permits the coil spring 44 to absorb shock loads exerted upon the wheel by such an impact, thus insuring a smooth and comfortable ride. An additional shock absorbing effect may be obtained, if so desired, by purposely causing a certain amount of friction caused to be present in the sliding engagement of the pins 30 and 32 within the bushings 40 and 42.

Since the pins 30 and 32 are fastened to the hub housing 12 along an axis which is perpendicular to the axis of the spindle 14, torsional forces exerted upon the pins 30 and 32 are minimized, thus permitting the simple design of the present invention.

A tie bar 50 is integrally joined to the hub housing 12 by welding or the like and extends therefrom at a right angle to the common axis of the pins 30 and 32. A steering arm (not shown) is adapted to be connected to a journaled bearing 52 at the end of the tie bar 50 to provide steering of the vehicle. Since the tie bar 50 is fastened to the hub housing 12 and the pins 30 and 32 are adapted for relative rotational movement with respect to the bushings 40 and 42, as hereinbefore described, horizontal displacement of the tie bar 50 by the steering arm will turn the wheel 10 about the vertical axis, thus, enabling steering of the vehicle. If desired, the steering arm may be attached to the tie bar 50 by other means, such as by a conventional ball joint (not shown).

In operations, the wheel 10 is adapted to engage the road surface and rotate in unison with the spindle 14 within the hub housing 12. When an impact with irregularities in the road surface causes the wheel 10 to move vertically with respect to the vehicle, the coil spring 44 and the friction between the pins 30 and 32 and the bushings 40 and 42 absorb the shock load exerted against the wheel.

When steering of the vehicle is desired, the tie bar 50 is horizontally displaced by the steering arm so as to point the wheel in the direction in which travel is desired. Since the bushings 40 and 42 permit relative rotational movement between the frame supporting arms 36 and 38 and the pins 30 and 32, the wheel will rotate about the vertical axis, thus permitting steering of the vehicle.

If it is desired that the steering wheel 10 be utilized as a driving wheel, the spindle 14 may be extended beyond the end of the hub housing 12 and connected by any suitable means, such as a universal joint to a driving shaft; thus, the suspension system may be utilized with a wheel that is both steered and driven without any modification to the basic design.

If it is desired that the wheel 10 be mounted for a nonsteering use, suitable means such as, for example, a key (not shown) disposed within the bushings 40 and 42 and respectively engaging a keyway in the pins 30 and 32 will prevent relative rotational movement about the vertical axis. Such a nonsteering wheel may also be used as a driving wheel without any substantial modification in the basic design of the inventive suspension system.

It can thus be seen that the present invention provides a simple and inexpensive suspension system for mounting a wheel on a vehicle in which one basic design may be utilized to accommodate the wheel, whether it be driven, or steered or both driven and steered.

Having thus described the invention, what is claimed is as follows:

I claim:

1. A suspension system for a vehicle or the like comprising:
   a wheel adapted for rotation about a generally horizontal axis,
   a spindle disposed along said axis and fixedly attached to said wheel and rotatable therewith,
   a nonrotatable housing having an elongated hollow tubular shape with a spindle receiving bore in which said spindle is disposed, said bore having a pair of spaced shoulders formed on the inner periphery thereof,
   a pair of bearings mounted in said spindle receiving bore intermediate the inner periphery of said housing bore and the outer periphery of said spindle to permit rotation of said spindle, said pair of bearings being disposed proximate the opposite ends of said housing and having an inner portion of each of said bearings in abutment with said shoulders to prevent inward movement thereof, and including means preventing relative axial movement between said spindle and said bearings,
   a pair of radially extending pins disposed in a vertical axis and fastened to said housing on opposite sides thereof,
   a pair of support arms for supporting said vehicle, each of said support arms having a bushing respectively surrounding said pins for both relative rotational movement about a vertical axis and relative slidable movement along said vertical axis,
   a spring surrounding the upper of said pins and disposed intermediate said housing and said bushing associated with said upper pin to absorb shock loads exerted against said wheel, said associated bushing being urged downwardly along said pin by the weight of said vehicle, said spring resisting said downward movement, and
   means for rotating said housing about said vertical axis to permit steering of said wheel.

2. The suspension system claimed in claim 1, including a tie bar fastened to said housing, said tie bar being so arranged that displacement thereof in a horizontal plane causes relative rotational movement of said pins and said bushings, whereby said wheel is rotated about said vertical axis to permit steering of said vehicle.

3. The suspension system as claimed in claim 1 wherein said pair of radially extending pins are each of a tubular construction having one end fixed to said housing in a cantilever fashion at a position intermediate said pair of bearings, the opposite free ends of each of said pins being radially spaced from the inner periphery of said wheel at a distance less than the width of said support arm bushing to prevent removal of said bushing from said pin when said spindle is within said spindle receiving bore.